United States Patent [19]
Kan et al.

[11] Patent Number: 5,727,229
[45] Date of Patent: Mar. 10, 1998

[54] METHOD AND APPARATUS FOR MOVING DATA IN A PARALLEL PROCESSOR

[75] Inventors: Larry Yiucham Kan; William C. Anderson; Chuan-Chang Hung; Meltin Bell, all of Austin, Tex.

[73] Assignee: Motorola, Inc., Schaumburg, Ill.

[21] Appl. No.: 596,843

[22] Filed: Feb. 5, 1996

[51] Int. Cl.$^6$ .................................................. G06F 15/16
[52] U.S. Cl. ............... 395/800.22; 395/379; 395/800.11; 395/800.09
[58] Field of Search ..................... 395/376, 379, 395/800.11, 800.2, 800.03, 800.09, 800.22, 800.06

[56] References Cited

U.S. PATENT DOCUMENTS

| | | | |
|---|---|---|---|
| 4,812,974 | 3/1989 | Wada et al. | 395/421.08 |
| 4,860,245 | 8/1989 | Kinoshita | 395/800.04 |
| 4,885,678 | 12/1989 | Kojima et al. | 395/800.06 |
| 4,949,247 | 8/1990 | Stephenson et al. | 395/800.06 |
| 5,010,477 | 4/1991 | Omoda et al. | 395/800.04 |
| 5,423,051 | 6/1995 | Fuller et al. | 395/800.07 |
| 5,537,562 | 7/1996 | Gallup et al. | 395/581 |
| 5,555,428 | 9/1996 | Radigan et al. | 395/800.22 |
| 5,600,811 | 2/1997 | Spielman et al. | 395/379 |

OTHER PUBLICATIONS

Asanovic et al. "Spert: A VLIW/SIMD Microprocessor for Artificial Neural Network Computations" IEEE, 1992.

Asanovic et al. "Spert: A VLIW/SIMD Neuro–Microprocessor" IEEE, 1992.

Motorola, Inc., "MC88100 RISC Microprocessor User's Manual", Second Edition; pp. 2–14, 2–15, and 6–10 (1990).

*Primary Examiner*—Larry D. Donaghue

[57] ABSTRACT

A method and apparatus for moving data in a parallel processing system (3). In one embodiment, a single instruction accesses one significant bit of information from each element in processing element array (80) and combines these bits into one designated element in global register file (50). The ordering of bits in vectors of global register file (50) associates each bit with an element of processing element array (80). Another single instruction distinguishes significant bit information from a particular vector in global register file (50) and transfers that information to an associated bit in storage circuits associated with each element in processing element array (80).

42 Claims, 5 Drawing Sheets

METHOD AND APPARATUS FOR MOVING DATA IN A PARALLEL PROCESSOR

REFERENCE TO RELATED APPLICATIONS

The present application is related to the following U.S. patent applications:

"Efficient Stack Utilization for Compiling and Executing Nested If-Else Constructs in a Vector Data Processing System", invented by Spielman, et al., Ser. No. 08/510,948, filed Aug. 3, 1995, and assigned to the assignee hereof;

"Vector Move Instruction in a Vector Data Processing System and Method Therefor", invented by Spielman, et al., Ser. No. 08/510,895, filed Aug. 3, 1995, and assigned to the assignee hereof now U.S. Pat. No. 5,600,816; and "A Data Processing System and Method Thereof", invented by Gallup, et al., Ser. No. 08/040,779, filed Mar. 31, 1993, assigned to the assignee hereof, and which is herein incorporated by reference.

FIELD OF THE INVENTION

The present invention relates in general to a data processing system, and more particularly to a method of moving data in a parallel processor.

BACKGROUND OF THE INVENTION

Fuzzy logic, neural networks, and other parallel, array oriented applications are becoming very popular and important in data processing. Most digital data processing systems today have not been designed with fuzzy logic, neural networks, and other parallel, array oriented applications specifically in mind. To illustrate the additional complexity and requirements of a parallel, array oriented processing system, herein generally referred to as a parallel system, it is helpful to first distinguish a non-array based processing system, herein generally referred to as a non-array based system.

Physically, a non-array based system typically includes one or more data processors each having a single processing element generally referred to as a central processing unit (CPU). A non-array based system, which uses a single instruction to operate on a single piece of data is referred to as an SISD system. In a SISD system, a single instruction affects a single CPU. Each CPU then has at least one associated memory storage device used for status, control, or operand storage.

In contrast, a parallel processing system typically includes a host processor having multiple processing elements. One example of a parallel system is a single instruction multiple data system, referred to as an SIMD system. In an SIMD system a single instruction affects multiple processing elements. Another example of a parallel system is a multiple input multiple data system, referred to as an MIMD, where multiple inputs affect multiple processing elements. Parallel systems include many combinations and configurations of processing elements. Structurally and functionally, parallel systems are more complicated and complex than non-array based systems.

The understanding and implementation of parallel systems presents some interesting and challenging problems. These problems are due in part to the lack of instructions developed based on the parallel, array nature of parallel systems. Parallel, array based processing has many advantages over non-array based processing as parallel, array based operations are performed in parallel rather than in tandem. Thus, no single processing element operates individually, but rather operates as part of a system of processing elements. Parallel systems effectively offer a more robust method of computing and data processing. There are considerable performance and cost benefits to be gained in designing data processing systems which are especially adapted and designed to meet the requirements of fuzzy logic, neural networks, digital signal processing, and other parallel, array oriented applications. It is necessary to consider the parallel nature of these parallel type processors and array based systems in order to design flexible, parallel, array based type instruction sets that are effective in parallel type data processing and operation.

DESCRIPTION OF PREFERRED EMBODIMENT

The present invention is a method and apparatus for moving data in a parallel processing system. In one embodiment of the present invention, a single instruction accesses one significant bit of information from each element in a processing element array and combines the bits into one designated location in a global register file. In one embodiment, the ordering of bits in a vector location of a global register file associates each bit with an element of the processing element array. In one embodiment, another single instruction distinguishes significant bit information from a designated location in a global register file and transfers that information to an associated bit in storage circuits associated with a plurality of elements in a processing element array.

Description of the Figures

Figure 1:
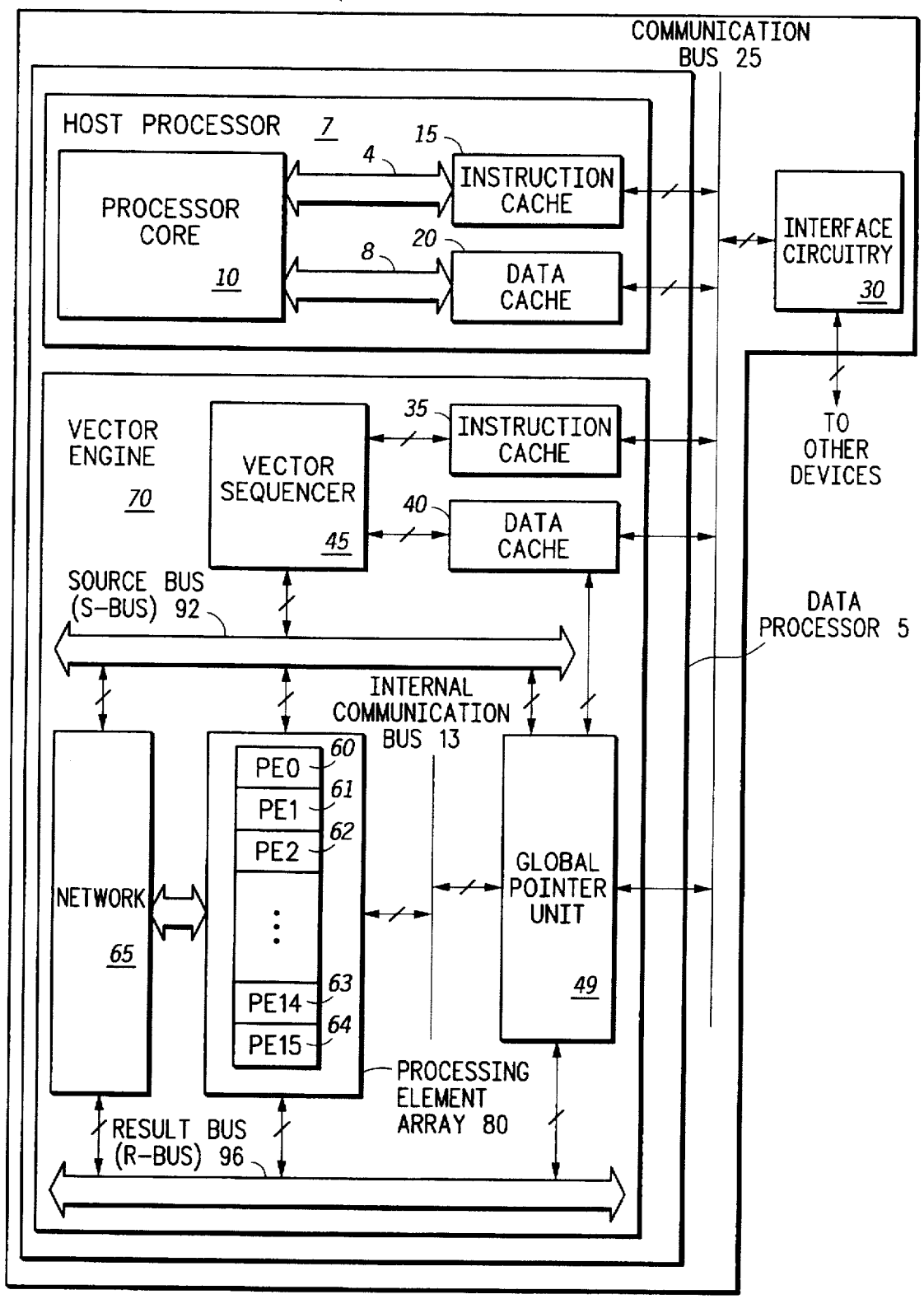
FIG. 1 illustrates, in block diagram form, a parallel processing system 3 in accordance with one embodiment of the present invention.

Referring to FIG. 1, in one embodiment of the present invention, a parallel processing system 3 includes a parallel data processor 5 having host processor 7, vector engine 70, and interface circuitry 30. Host processor 7 consists of a processor core 10, coupled to instruction cache 15 by bus 4 and coupled to data cache 20 by bus 8. Instruction cache 15, data cache 20, and interface circuitry 30 are each coupled to communication bus 25 by way of bi-directional multiple conductors. Communication bus 25 allows communication between host processor 7, interface circuitry 30, and vector engine 70. In alternate embodiments, interface circuitry 30 is any type of circuitry which allows communication between data processor 5 and other devices.

Referring to FIG. 1, in one embodiment of the present invention, data movement and operations within vector engine 70 are controlled by vector sequencer 45, which is bi-directionally coupled by multiple conductors to instruction cache 35 and to data cache 40. Instruction cache 35 and data cache 40 are each coupled to communication bus 25 by way of bi-directional multiple conductors. Note that other embodiments allow uni-directional, bi-directional or a combination for conductors among instruction cache 35, data cache 40, vector sequencer 45, and communication bus 25. Vector engine 70 communicates with other modules in parallel processing system 3 via communication bus 25, and further with other devices by way of interface circuitry 30. Flexibility allows vector engine 70 to function as an autonomous module within parallel processing system 3.

As illustrated in FIG. 1, vector engine 70 consists of vector sequencer 45, network 65, processing element array 80 and global pointer unit 49. All of three communicate through two busses, namely a source bus (S-bus) 92 and a result bus (R-bus) 96. Vector sequencer 45, network 65, processing element array 80, and global pointer unit 49 are each coupled to S-bus 92 by way of bi-directional multiple conductors. Additionally, network 65, processing element array 80, and global pointer unit 49 are each coupled to R-bus 96 by way of bi-directional multiple conductors. In one embodiment, global pointer unit 49 is a global data path unit. Vector sequencer 45 controls data movement and operations within vector engine 70 by providing signals to network 65, processing element array 80, and global pointer unit 49. In one embodiment vector sequencer 45 receives status signals from within vector engine 70 and affects control decisions accordingly. Instruction cache 35 and data cache 40 are local within vector engine 70 and each communicate through communication bus 25 by way of bi-directional multiple conductors.

Further, referring to FIG. 1, internal communication bus 13 couples processing element array 80 and global pointer unit 49. Network 65 is directly coupled to processing element array 80. In one embodiment of the present invention, processing element array 80 is composed of sixteen processing elements PE(0) 60, PE(1) 61, PE(2) 62 through PE(14) 63, and PE(15) 64. Global pointer unit 49 communicates with data cache 40 by way of bi-directional conductors.

Figure 2:
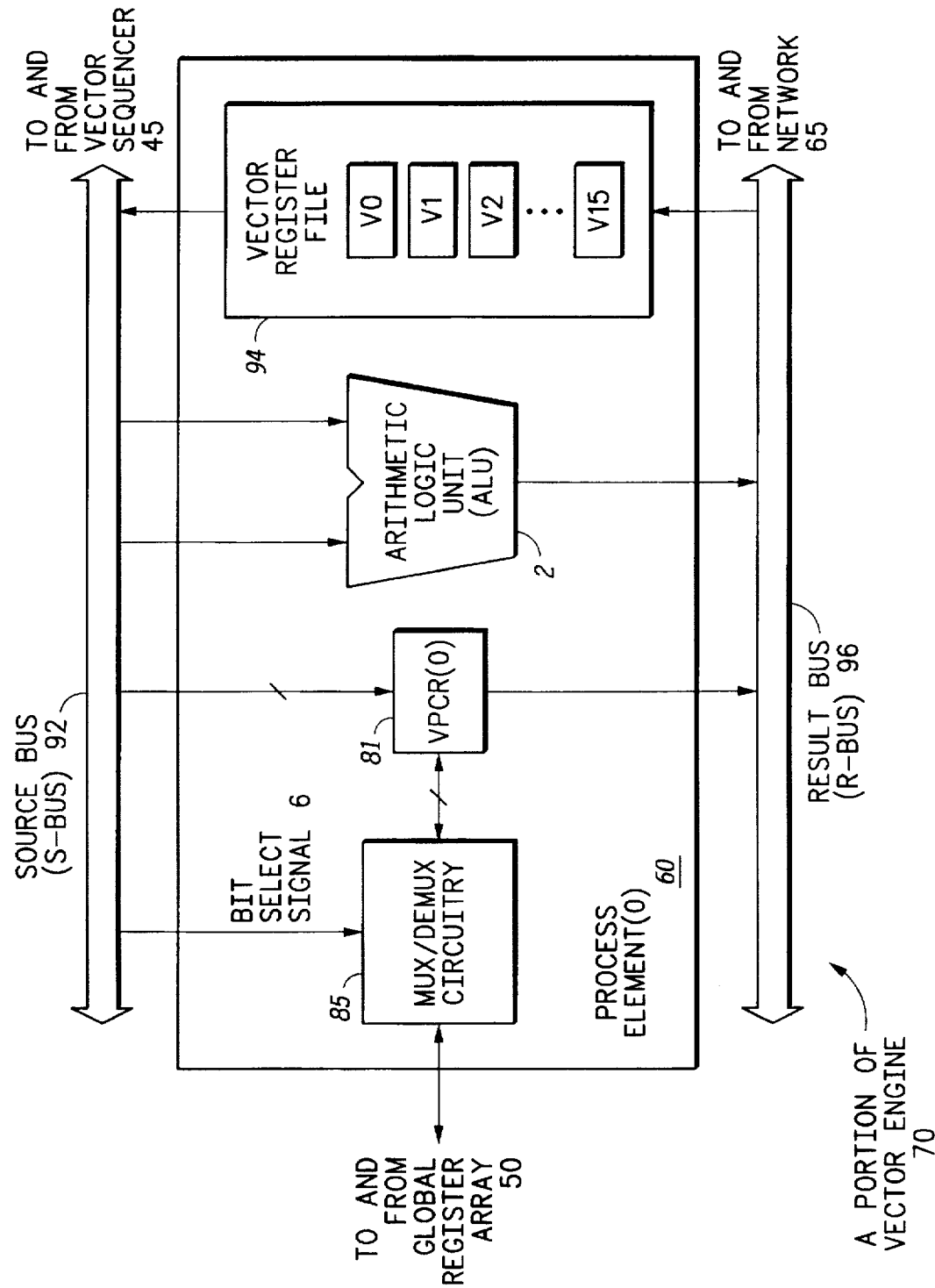
FIG. 2 illustrates, in block diagram form, a portion of vector engine 70 in accordance with one embodiment of the present invention.

FIG. 2 illustrates a portion of vector engine 70 in one embodiment of the present invention, where processing element PE(0) 60 is exemplary of all processing elements PE(0) to PE(15) 64 in processing element array 80. Note that PE(0) 60 is analogous to an individual CPU, containing circuitry for data movement, control and status registers, memory storage locations, and logic circuitry. Vector sequencer 45 provides decoded instructions, data, and control signals to PE(0) 60 through S-bus 92. In one embodiment, multiple conductors provide data from S-bus 92 to control register VPCR(0) 81 and multiple conductors provide data from VPCR(0) 81 to R-bus 96. In one embodiment, circuitry for data movement, mux/demux circuitry 85, receives bit select signal 6 via a conductor from S-bus 92. In alternate embodiments, multiple conductors are used provide a multiple bit select signal 6. In one embodiment, control signals are provided by mux/demux circuitry 85 to VPCR(0) 81 via bi-directional multiple conductors and logic and logic operations are performed by arithmetic logic unit (ALU) 2, where ALU 2 receives inputs from S-bus 92 via two uni-directional conductors, and transmits an output to R-bus 96 by way of a uni-directional conductor. Note that in one embodiment of the present invention, S-bus 92 provides inputs to mux/demux circuitry 85, VPCR(0) 81, and ALU 2, while their outputs are directed to R-bus 96. Vector Register File 94, however, receives input from R-bus 96 and provides output to S-bus 92. Uni-directional multiple conductors couple vector register file 94 to S-bus 92 and to R-bus 96. In one embodiment, vector register file 94 is a local memory storage unit, consisting of sixteen registers. Alternate embodiments may consist of any number of registers or memory storage units. In one embodiment, decoded instructions, data, and control information from vector sequencer 45 are provided to PE(0) 60 by way of S-bus 92, and output information, status information, and data from PE(0) 60 are provided to network 65 by way of R-bus 96.

Figure 3:
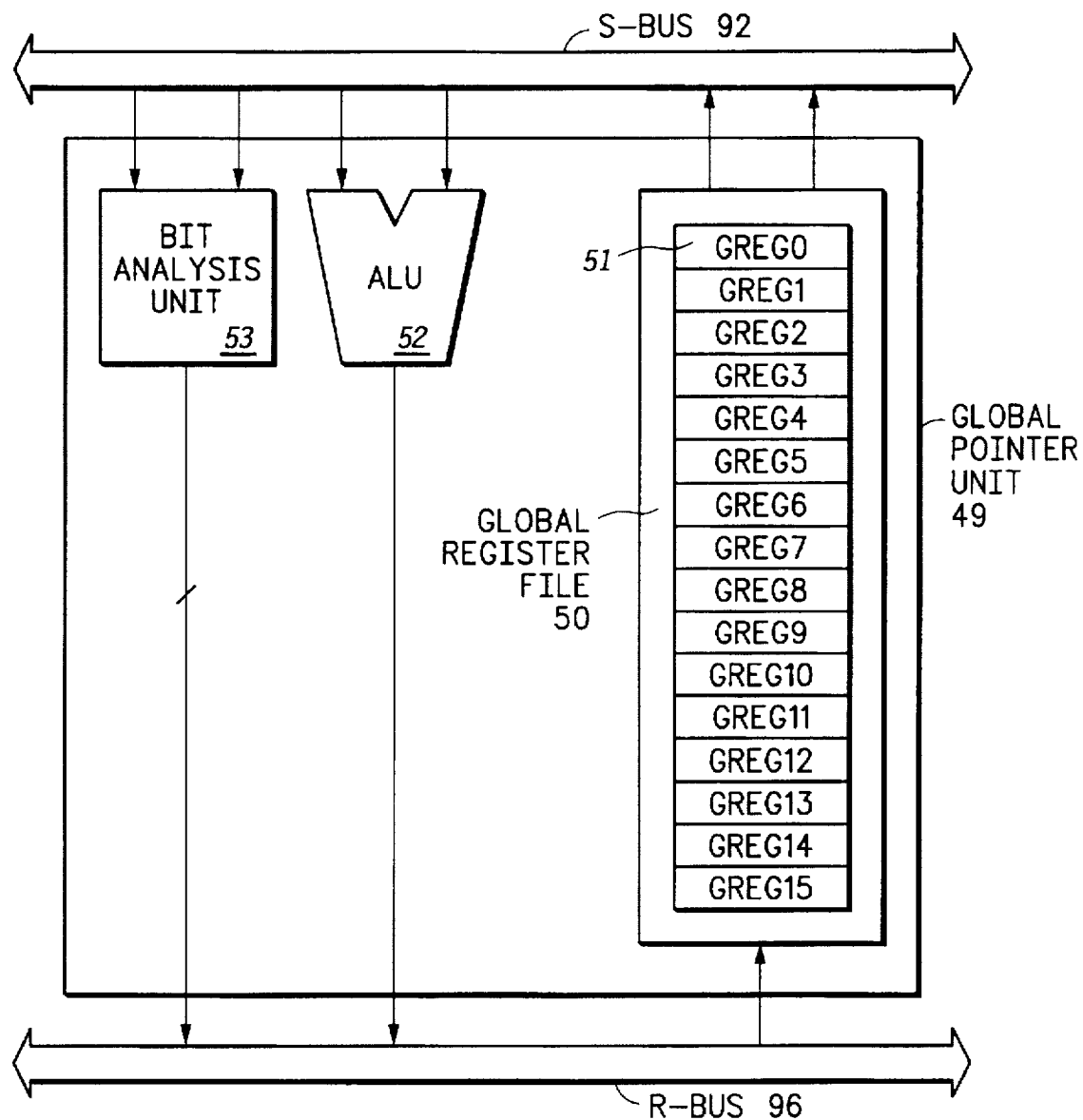
FIG. 3 illustrates, in block diagram form, a global pointer unit 49 in accordance with one embodiment of the present invention.

Processing element array 80 also communicates with global pointer unit 49 via internal communication bus 13. Global pointer unit 49, illustrated in FIG. 3, is a local memory storage unit, within vector engine 70, for storing global information. Typically, global information is such that it may be accessed by various parts of vector engine 70 and parallel processing system 3. In one embodiment, global pointer unit 49 includes bit analysis unit 53, which receives inputs from S-bus 92 by way of uni-directional conductors, and provides an output to R-bus 96 by way of uni-directional multiple conductors. Similarly, input to ALU 52 is provided by way of uni-directional conductors from S-bus 92, while ALU 52 outputs to R-bus 96 by way of uni-directional conductors.

In one embodiment, global register file 50 is an array of sixteen global registers or vectors, such as GREG(0) 51. Alternate embodiments include any number of global registers. Global register file 50 receives input from R-bus 96 by way of uni-directional conductors and provides output to S-bus 92 by way of uni-directional conductors. Note that alternate embodiments may use any number of conductors, bi-directional or uni-directional, to allow data and signal flow in global pointer unit 49 and processing elements PE(0) 60 to PE(15) 64.

One embodiment of the present invention considers data movement among processing element array 80 and global register file 50. Initially, FIG. 1 illustrates an overall parallel processing system 3. Then, FIG. 2 focuses on an individual processing element, PE(0) 60, while FIG. 3 focuses on a global pointer unit 49.

Figure 4:
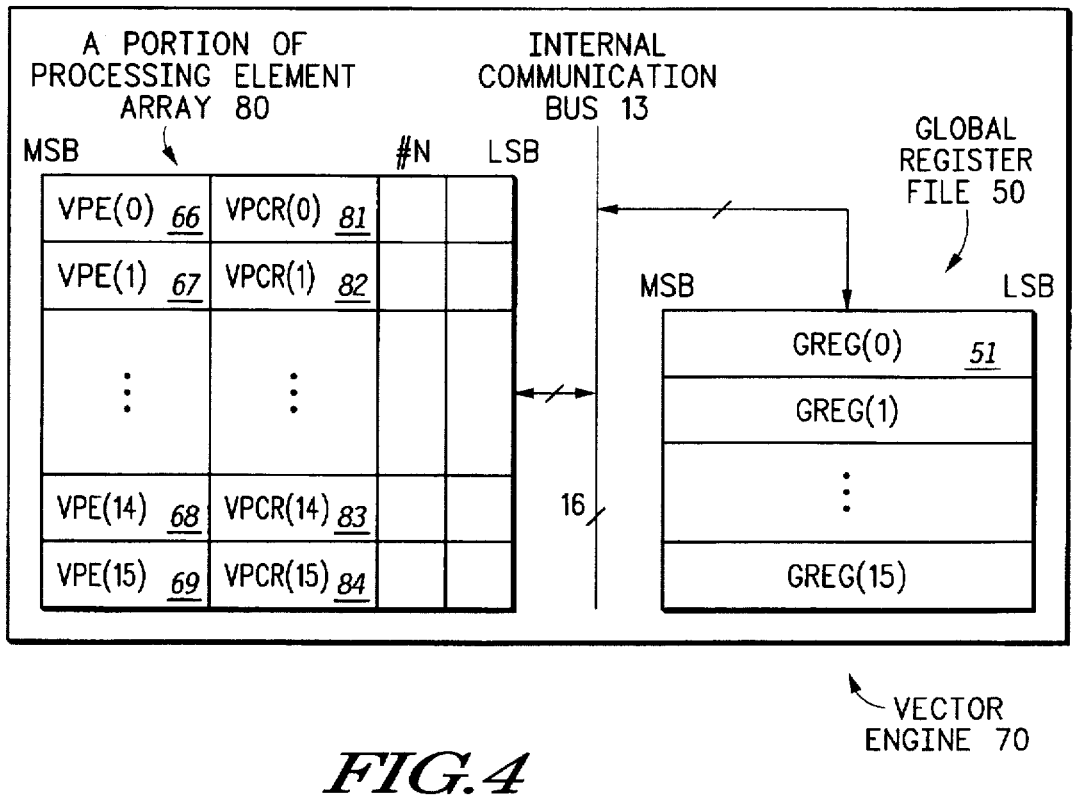
FIG. 4 illustrates, in block diagram form, a portion of a processing element array 80 and a global register file 50 of a vector engine 70 in accordance with one embodiment of the present invention.

Proceeding, FIG. 4 serves to illustrate data movement by considering a portion of processing element array 80, internal communication bus 13, and global register file 50, thus allowing a clear description of one embodiment of the present invention.

As illustrated in FIG. 4, in one embodiment, global register file 50 consists of sixteen vectors, such as GREG(0) 51. Global register file 50 is a part of global pointer unit 49, which is coupled to internal communication bus 13 by way of bi-directional multiple conductors. Alternate embodiments may include one or any number of conductors. In one embodiment, internal communication bus 13, which is coupled to processing element array 80 by way of bi-directional multiple conductors, serves as a communication path for data movement.

Note that although for visualization purposes, a portion of processing element array 80 is diagrammed as a vector array, typically, control vectors are contained within processing elements and are therefore physically separated. In one embodiment, each processing element in processing element array 80 has within it at least one memory vector and at least one control register. Referring to FIG. 4, associated memory vectors VPE(0) 66, VPE(1) 67 through VPE(14) 68, VPE(15)69, and control registers VPCR(0) 81, VPCR(1) 82 through VPCR(14) 83, VPCR(15)84, have index numbers which correspond to associated processing elements. As illustrated in FIG. 4, "#N" indicates bit selection for data movement, (i.e. data in bit location "#N" is the object of the data movement.) In one embodiment of the present invention, "#N" indicates bit selection of each vector in a portion of processing element array 80. In one embodiment "#N" is a selectable bit and can be any bit in associated memory vectors VPE(0) 66 to VPE(15)69, or control registers VPCR(0) 81 to VPCR(15)84. In alternate embodiments "#N" is a predetermined bit.

In one embodiment, global register, GREG(0) 51, has sixteen bits, each bit having a significance to a corresponding processing element. As illustrated in FIG. 4, in one embodiment of the present invention, for data movement away from processing element array 80, data in bit location "#N" of VPCR(0) 81 moves to least significant bit location (bit 0 or LSB) in GREG(0) 51. Data in bit location "#N" of VPCR(1) 82 moves to the next sequential bit location (bit 1) in GREG(0)51. In general, data in bit location "#N" of VPCR(n) moves to bit "n" of GREG(0) 51. After data movement, global register GREG(0) is a compilation of data from bit location "#N" for all processing elements.

Figure 5:
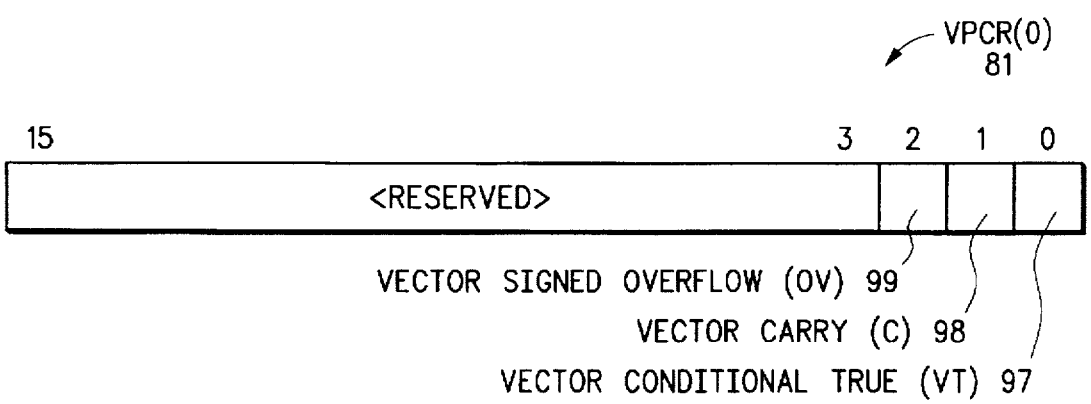
FIG. 5 illustrates, in block diagram form, a control register in accordance with one embodiment of the present invention.

In one embodiment of the present invention, illustrated in FIG. 5, control information for PE(0) 60 is stored in VPCR(0), and includes vector signed overflow (OV) 99, vector carry (C) 98, vector conditional true (VT) 97, as well as thirteen reserved bits. The present invention offers a data movement to compile specific bit information from each of a plurality of processing elements into a single memory location. Additionally, the present invention offers a method of moving data from a single memory location to a specific bit location for each of a plurality of processing elements.

Figure 6:
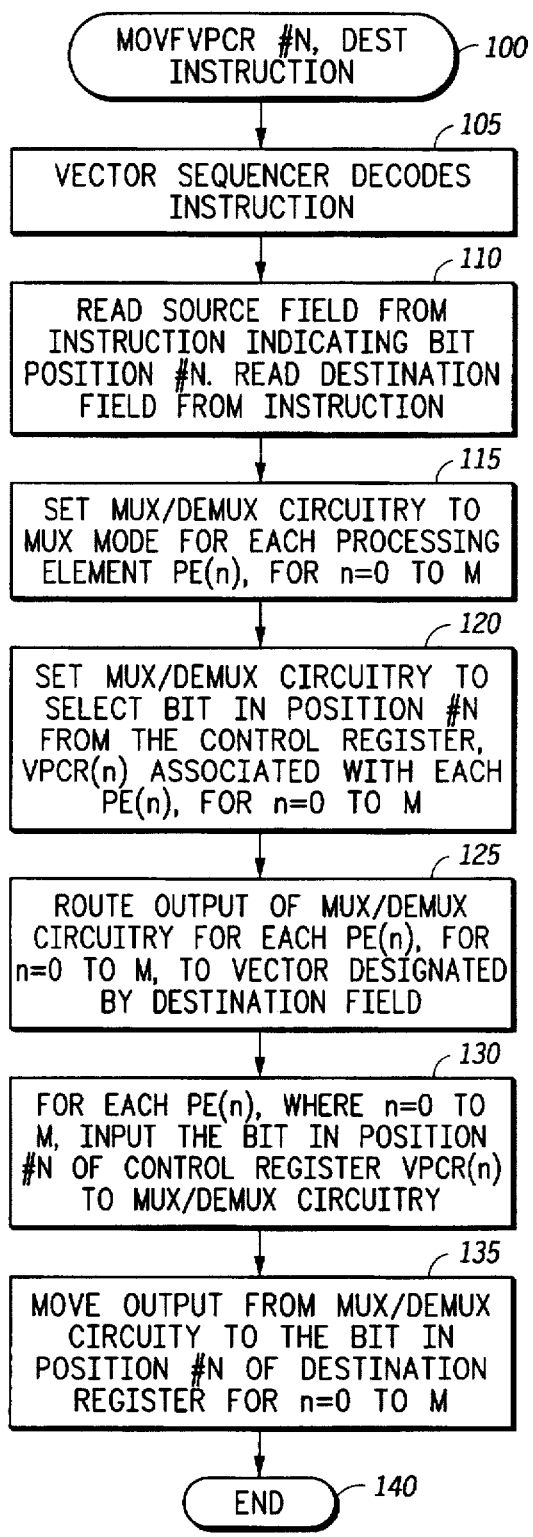
FIG. 6 illustrates, in flow diagram form, a method of moving data from a processing element in accordance with one embodiment of the present invention.
Figure 7:
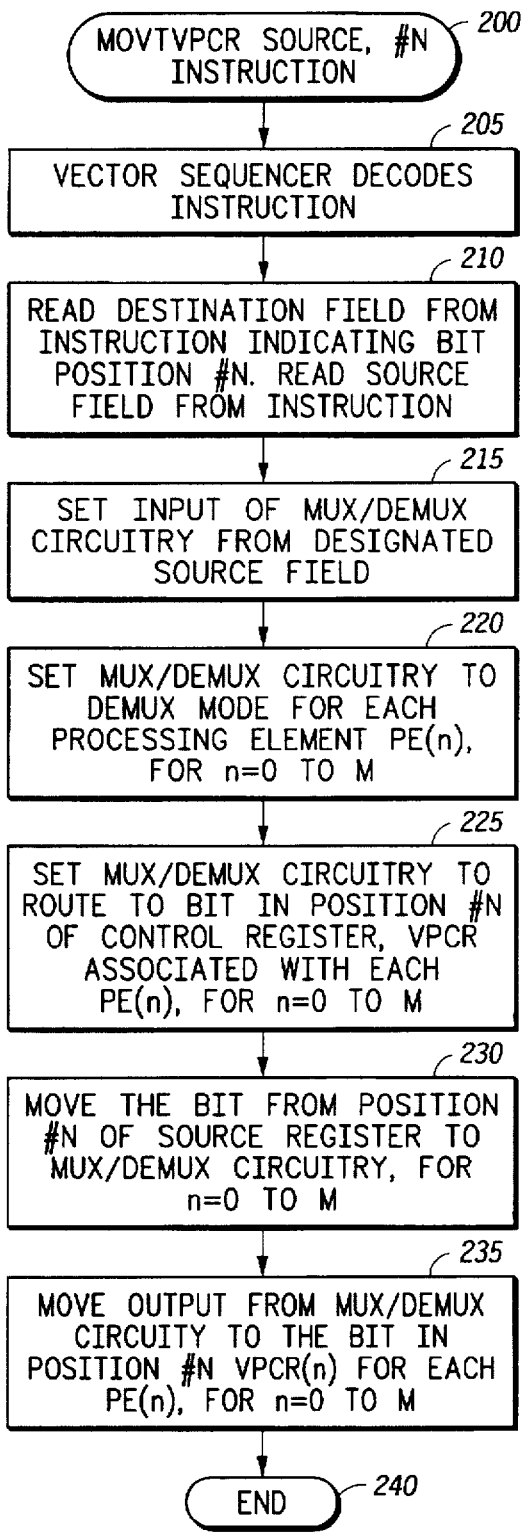
FIG. 7 illustrates, in flow diagram form, a method of moving data to a processing element in accordance with one embodiment of the present invention.

For clarity, FIGS. 6–7 illustrate in flow diagram form, a method for performing data movement in vector engine 70. Flattened ovals 100 and 200 represent starting points, while 140 and 240 represent ending points for each instruction. Rectangles 105, 110, 115, 120, 125, 205, 210, 215, 220, and 225 represent control steps. Rectangles 130, 135, 230, and 235 represent data movement steps.

Operation of Preferred Embodiments

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status. The terms "assert" and "negate" will be used when referring to the rendering of a signal, status bit, or similar apparatus into its logically true or logically false state, respectively. If the logically true state is a logic level one, the logically false state will be a logic level zero. And if the logically true state is a logic level zero, the logically false state will be a logic level one.

For identification purposes, each processing element (PE) will be given an associated index number "n", which will be a suffix. Each individual PE in processing element array 80 has an assigned value "n", where n={0, 1, 2, ..., 15}, with each PE being referred to as PE(n). In processing element array 80, there are sixteen processing elements, the third PE being referred to as PE(2) 62. Additionally, each component within a given PE is assigned the same index number "n". For example, in one embodiment, where control and status information are stored in a control register called "VPCR", with reference to PE(2) 62, which has an index number of "2", its associated control register VPCR will be labeled VPCR(2). Uniform notation allows concise and accurate identification of elements within processing element array 80.

Refer now to the drawings wherein depicted elements are not necessarily shown to scale and wherein like or similar elements are designated by the same reference numeral through the several views.

A non-array based system typically includes one or more data processors each having a single processing element generally referred to as a central processing unit (CPU). In a SISD system, a single instruction affects a single CPU. Each CPU then has at least one associated memory storage device used for status, control, or operand storage.

Functionally, control information defines the operation of the CPU, while status information indicates the resultant state of the CPU after each operation is completed. Status information and control information can be stored in separate registers or in a single status and control register. Control information can also be affected by status information. Note that in addition to status and control registers, any number of specially designated memory storage devices can be used to perform any number of functions. A memory storage device can consist of a single vector, (i.e. one row), and be of uniform length.

Typically, a non-array based system consists of one data processor having one CPU, one control register and one status register. Control information is stored in a control register. Control information defines the operation of a CPU. In other words control information indicates the control parameters affecting CPU operating conditions. Control parameters can be changed or verified by access to individual bits of a control register. For example, in one embodiment, control parameters include interrupt sensitivity, peripheral enablement, and port configuration. Interrupt sensitivity refers to that input condition which will trigger an interrupt, for example, a rising edge will cause CPU interruption from its normal operation. Interrupt sensitivity is selectable and has associated bit or bits in the control register. Interrupt sensitivity is controlled by these bits. Likewise, peripheral enablement and port configuration have an associated bit or bits in the control register. Peripheral enablement refers to the enabling and disabling of a peripheral module. For example, analog to digital converter (ADC) enablement uses a bit or bits in control register to enable or disable an ADC. In a system with many peripheral modules, each module may have an associated peripheral enablement or multiple peripheral modules may be grouped together and have a common peripheral enablement which enables those modules as a group. Port configuration refers to conditions at a port, such as high impedance, or any other selectable port condition. As with other parameters, port configuration is controlled by an associated bit or bits in the control register. One control register can then be used to control multiple parameters.

Similarly, status information can be stored in a status register or a status and control register. Status information indicates the resultant state of a CPU after each operation is completed. Status information can include overflow status, zero result, or any other condition indication. Each status condition has an associated bit or bits in the control register. A given status can be evaluated by accessing those bits with associated significance. The data processor affects control decisions and determines status conditions by manipulating and evaluating the associated bits in control and status register(s). Such manipulation and evaluation typically involves moving data into and out of these registers. In non-array based system, a data processor need only affect control or evaluate status for one CPU. Often evaluation of each status requires one or several instructions to move data out of an individual register. Likewise, often control of each parameter requires one or several instructions to move data into an individual register. As the number of control parameters and status conditions increase, data movement tends to become tedious and slow.

Note that alternate embodiments may have any number of control and status parameters, the nature of which will be dependent on the type of system.

Structurally and functionally, parallel systems are more complicated and complex than non-array based systems and therefore data movement complexity is magnified. A parallel system typically includes one or more host processors, each having one or more processing elements. One example of a parallel system is a single instruction multiple data (SIMD) system, where a single instruction affects multiple processing elements. Another parallel system is a multiple instruction multiple data (MIMD) system where multiple instructions affect multiple processing elements. Parallel systems include any number of combinations and configurations of processing elements.

As illustrated in FIG. 1, a host processor 7 can be physically distinct from the processing elements. In one embodiment of the present invention, processing elements PE(0) 60 to PE(15) 64 are combined into processing element array 80, which is a part of vector engine 70. Vector engine 70 is a self contained module which interfaces with other modules within data processor 5 and parallel processing system 3.

Within processing element array 80, each processing element PE(0) 60 to PE(15) 64 is an individual data processing system, which may include associated memory storage devices, arithmetic logic units (ALU), control circuits, and any other type of logic circuit. One embodiment of an individual processing element is illustrated in FIG. 2, where an associated memory storage device is a vector processing control register (VPCR.) Register VPCR(0) 81 is used to affect control of processing element 60. Each processing element PE(0) 60 to PE(15) 64 in processing element array 80 is similar to a single CPU in a non-array based system. In a parallel system however, data is processed by processing elements PE(0) 60 to PE(15) 64 in a parallel or synchronous fashion. The process flow is parallel, requiring control decisions to be implemented over multiple processing elements PE(0) 60 to PE(15) 64.

In one embodiment of the present invention, control information and status information particular to an individual is processing element are stored in an associated memory storage device, VPCR(0) 81. Control information defines the operation of that one individual processing element. Likewise, status information indicates the resultant state of that one individual processing element after each operation is completed. In one embodiment of the present invention, a parallel processing system 3 has memory storage devices which are physically separated, rather than physically combined into a register file or array. Each memory storage device is contained within its associated processing element. Individual processing elements are then combined into one processing element array 80.

In one embodiment of a parallel system, the processing element array includes sixteen processing elements PE(0) 60 to PE(15) 64. Each processing element PE(0) 60 to PE(15) 64 has at least one control register, VPCR, or associated memory storage device. In a parallel system, control decisions are made for processing element array 80. Since processing element array 80 is made up of multiple processing elements PE(0) 60 to PE(15) 64, control decisions involve multiple processing elements PE(0) 60 to PE(15) 64. Likewise, evaluating status conditions of processing element array 80 requires consideration of status conditions of multiple processing elements PE(0) 60 to PE(15) 64. Processing element array 80 is defined by the operation of its individual processing elements PE(0) 60 to PE(15) 64. There are sixteen control registers that define the operation of processing element 80. Affecting control and evaluating status of processing element 80 entails data movement involving multiple control registers.

Non-array based systems process data sequentially through a CPU. Data movement instructions are used to affect control and allow status evaluation of an individual CPU. Data movement instructions manipulate the CPU's control register. Parallel systems require similar data manipulations for a plurality of processing elements PE(0) 60 to PE(15) 64. A single data move in a SISD system may become a complex, tedious operation in a parallel system. Though the parallel nature of the parallel system requires more flexible methods of manipulating data, many instructions remain inherently sequential due to the sequential nature of non-array based processing.

Sequential type instructions tend to handle only limited amounts of data per instruction and often require temporary interim memory storage units for adaptation to parallel systems. In one embodiment having a plurality of vector arrays that serve as interim storage units, data is easily moved into interim registers for later access or compilation. In one embodiment, data is compiled in the interim storage units and then moved to a global register. Moving data into an interim storage unit typically requires additional programming, additional storage units, and increases data processing time.

Additionally, these sequential type instructions are typically designed to deal with only one memory location or register at a time, while parallel processing requires a more sophisticated method of moving data in parallel fashion. Sequential instruction sets were not designed to operate between vector arrays. Therefore, using sequential instruction sets in parallel systems often results in multiple instructions and/or many iterations of instructions, resulting in slower processing. Parallel processing is based on vector array interaction, and often involves vector array to scalar array (i.e. single register) interface. Sequential instructions were not designed to handle vector array movements and are not sufficient to meet the needs of parallel processing.

A further requirement of parallel, array based systems and any vector based system, is the need to calculate the sum, or total, of the elements of a vector. In some applications, only a scalar result (i.e. the total of all vector elements) is required. In other applications, a vector of cumulative sums must be calculated. The need for combining vector elements into a single overall aggregate value or into a vector of cumulative partial aggregates is not limited to addition. Other aggregation operations, such as minimum and maximum, are also required for some applications. These aggregation operations may include logical operations performed over a combination of individual bits from a plurality of vectors. A more effective technique and mechanism for combining vector elements into a single overall aggregate value is required.

In one embodiment, the present invention is a method and apparatus for moving data in a parallel type data processor 5, and is part of an instruction set designed specifically for parallel processing. Data processor 5 is part of parallel processing system 3. The following describes one embodiment of the present invention in which a host processor 7 communicates with the vector engine 70 by way of a communication bus 25. Host processor 7 controls the high level operation of data processor 5, including vector engine 70. Host processor 7 coordinates data movement within data processor 5 as well as communication with other modules in parallel processing system 3.

Data movement within and between modules of data processor 5 can be performed autonomously, when a module is capable of operations without host processor 7 control. Vector engine 70 receives instructions and data from host processor 7. Vector engine 70 includes instruction cache 35, data cache 40, processing element array 80, and vector sequencer 45 internally. Processing element array 80 operates in parallel fashion. In one embodiment, vector engine 70 performs internal data movements without control from host processor 7. The present invention refers to the parallel operation of vector engine 70 and its processing element array 80. Therefore, the remainder of the discussion will focus on vector engine 70, its components, and its internal data processing.

Vector engine 70 consists of a processing element array 80, which contains a plurality of processing elements which can be identical to each other or can be different. Processing element array 80 can include any number of processing elements PE(0) 60 to PE(15) 64. For concise discussion, processing element PE(0) 60 will be representative of each of processing elements PE(0) 60 to PE(15) 64.

In one embodiment, each processing element PE(0) 60 to PE(15) 64 functions as an individual CPU. Each processing element PE(0) 60 to PE(15) 64 requires control information, status information, and input data. Each processing element PE(0) 60 to PE(15) 64 then processes data and provides output data and status information based on control information. In one embodiment of the present invention, status information may be used for control purposes.

The processing of data and its propagation through each element is performed by instructions and algorithms implemented within vector engine 70 and available within data processor 5. Vector engine 70 receives instructions and data by way of communication bus 25. Internally, vector engine 70 stores instructions in instruction cache 35. In response to instructions, vector sequencer 45 transmits appropriate signals by way of source bus (S-bus) 92. Transmitted signals serve to initiate, designate, and control data movement and data manipulation within vector engine 70.

In one embodiment, data is stored in data cache 40 and is accessible to vector sequencer 45, to global register file 50 and to other portions of data processor 5, by way of communication bus 25, including host processor 7 and interface circuitry 30. Effectively, vector engine 70 is a self contained unit which receives and transmits data and instructions and which is capable of internal control implemented by vector sequencer 45 based on instructions in instruction cache 35. Vector engine 70 maintains a global register file 50, which contains global registers which are accessible throughout vector engine 70. In alternate embodiments, each global register may be a single vector or an array of vectors.

Processing elements PE(0) 60 to PE(15) 64 of processing element array 80 may be physically separated in some embodiments of the present invention. Although, in FIG. 1, processing elements PE(0) 60 to PE(15) 64 have been conceptually drawn as a plurality, arranged in array form comprising processing element array 80. Each processing element is then considered an individual processing system having any combination of associated memory storage circuits, logic units, multiplex and demultiplex circuits, and other type circuits internally contained.

In one embodiment of the present invention, control register VPCR(0) 81, illustrated in FIG. 5, is sixteen bits long, with thirteen upper bits reserved. In one embodiment, bit 0 is designated as vector conditional true (VT) bit (e.g. VT bit 97 in FIG. 5.) The VT bit 97 is a control bit, which controls the operation of its associated processing element PE(0) 60. In one embodiment, asserting VT bit 97 enables processing element PE(0) 60, and negating VT bit 97 disables processing element PE(0) 60. Enabling a PE makes it available for the next operation, in effect VT bit 97 turns on PE(0) 60. Conversely, disabling processing element PE(0) 60 excludes it from the next operation. The VT bit from each processing element PE(0) 60 to PE(15) 64 in processing element array 80, determines if that PE will be included in the next operation.

Data movement within components of vector engine 70 is carried out by executing one or more instructions, as in a non-array based system. However, a parallel system often requires synchronous data movement to and from processing element array 80, (i.e. data moves to and from multiple processing elements concurrently.) Such data movements may involve any combination of memory registers, caches, vector arrays, and any other type of storage circuit.

In one embodiment of the present invention, as illustrated in FIG. 2, one processing element, namely PE(0) 60, is exemplary of all other processing elements PE(0) 60 to PE(15) 64 in processing element array 80. PE(0) 60 includes multiplex/demultiplex (mux/demux) circuitry 85, associated control register (VPCR(0)) 81, arithmetic logic unit (ALU) 2, and vector register file 94. Processing element 60 communicates with vector sequencer 45 by way of S-bus 92 and result bus (R-bus) 96.

Mux/demux circuitry 85 transmits data to and receives data from global register array 50. In multiplex (mux) mode data moves from VPCR(0) 81 to global register file 50, while in demultiplex (demux) mode data movement is in the opposite direction. A bit select signal 6 transmits control information from vector sequencer 45 to mux/demux circuitry 85 indicating the direction of data movement. In alternate embodiments of the present invention, other signals are provided to transmit any number of different control information. Mux/demux circuitry 85 is bi-directionally coupled between global array file 50 and VPCR(0) 81. PE(0) 60 has access to S-bus 92 and R-bus 96, which allows other types of data manipulation.

The monitoring and control of an individual PE of processing element array 80 is similar to the monitor and control of an individual CPU. A single instruction used to move data to a control register affects the control of an individual processing element. In one embodiment, VPCR (0) 81 is a sixteen bit control register which also stores status information. Individual bits of VPCR(0) 81, each having predetermined significance, such as controlling the operation and indicating the status of associated processing element PE(0) 60.

In a typical control scheme, one or more bits in control register VPCR will be used to enable or disable its associated processing element. In one embodiment of the present invention, the least significant bit (LSB) of VPCR(0) 81 is called VT bit 97 and is used to enable or disable associated processing element PE(0) 60, based on its logic state, where assertion of VT bit 97 enables processing element PE(0) 60 and negation disables processing element PE(0) 60. Only PE(0) 60 is enabled or disabled by VT bit 97.

Similarly, enabling other processing elements in processing element array 80, requires assertion of associated VT bits. In one embodiment of the present invention, vector engine 70 accesses the VT bit from each of a plurality of processing elements in processing element array 80, to affect appropriate control decisions for enabling or disabling each PE. Parallel processing control decisions are is affected over a plurality of PEs prior to processing. Non-array based instructions allow only single processing element control. However, the parallel system needs to monitor and control a plurality of PEs concurrently. As the number of elements increases, the complexity of such monitoring and control becomes unwieldy, resulting in time delays and excess programming.

In one embodiment of the present invention, a single instruction distinguishes significant bit information from a particular vector in global register file 50 and transfers that information to an associated bit in storage circuits associated with each element in processing element array 80. As illustrated in FIG. 2, in response to the instruction, vector sequencer 45 transmits a signal to mux/demux circuitry 85, indicating the direction of data movement In one embodiment, vector sequencer 45 receives direction information from instructions stored in cache 35, and one instruction is used to affect control decisions in multiple processing elements PE(0) 60 to PE(15) 64 in processing element array 80.

In one embodiment of the present invention, a single instruction is given the mnemonic "MOVTVPCR, which indicates a data move from global register file 50 to each VPCR. In one embodiment, an instruction format labels a source field as "source" and a destination bit position as "#N". The instruction format is written as "MOVTVPCR" "source", "#N"

The data path of movement is illustrated in FIG. 4, where global register file 50 includes several registers or vectors. Source field "source" refers to the address of an individual register. In one embodiment of the present invention, a predetermined register in global register file 50 stores information from all processing elements in processing element array 80. In one embodiment, a source register has bit significance with respect to individual processing elements. In one embodiment, a sequential correlation is used to identify bit positions within the source register. For example, PE(2) 62 has index number 2. PE(2) 62 is associated with the bit 2 of the source register. Likewise, PE(0) 60, has index number 0, and is associated with bit 0 of the source register.

Since VT information is stored in the source register, it is available to efficiently evaluate the status of all PEs in processing element 80. Conversely, by changing values in the source register, instruction "MOVTVPCR" allows control of all PEs to be affected with a single instruction.

Instruction "MOVTVPCR" is used to move data from a source register to a destination bit position within each of a plurality of PEs. In one embodiment of the present invention, the destination location is predetermined as control registers VPCR(n), where n=0, 1, 2, . . . , 15, one in each PE in processing element array 80. The destination bit position is then selectable and designated "#N", where "#N" is consistent in all control registers affected. However, alternate embodiments may include additional parameters, allowing selection of other destinations.

When vector sequencer 45 receives instruction "MOVTVPCR", it transmits bit select signal 6 to initiate the data movement. Data movement is from global register file 50 to mux/demux circuitry 85. Instruction "MOVTVPCR" indicates that movement is toward processing element array 80 and mux/demux circuitry 85 is to be in demux mode. In one embodiment, each bit in VPCR(0) 81 is connected to mux/demux circuitry 85. Mux/demux circuitry receives a bit of information, bit "n" of the source register, and transfers that to bit position "#N" of the VPCR(n) associated with PE(n).

In one embodiment, VT bit 97 is the least significant bit of VPCR(0) and therefore destination bit position is predetermined to N=0. The VT bit is used to enable or disable a PE in processing element array 80. Control of processing element array 80 involves processing elements PE(0) 60 to PE(15) 64. In order to configure processing element array 80 with each PE enabled or disabled as necessary, vector engine 70 determines those PE to be enabled and those PE to be disabled. Vector engine 70 then enables or disables PE(n) by asserting or negating the associated VT bit in VPCR(n), for n=0, 1, 2, . . . , 15. Here, a single instruction configures processing element array 80 for the next operation. Thus the next instruction may only use or affect the enabled processing elements. In alternate embodiments, VT control information of individual processing elements PE(0) 60 to PE(15) 64 is stored in two or more bits.

Alternately, for many calculations and processing decisions, vector engine 70 evaluates the status of each PE. Compiling information into global registers, such as global register file 50, allows easy, complete access within vector engine 70. In one embodiment of the present invention, the synchronous nature of the parallel system requires that data or information from physically, logically, or otherwise distinct areas of the system be evaluated and manipulated concurrently. Data from each individual PE is combined into a format which allows quick access to information from a plurality of processing elements PE(0) 60 to PE(15) 64. Here data movement is out of processing elements PE(0) 60 to PE(15) 64 and is particularly beneficial for evaluation of status bits upon which later decisions are made, and can be used for verification and feedback to processing elements PE(0) 60 to PE(15) 64.

In one embodiment of the present invention, a single instruction accesses one significant bit of information from each PE in processing element array 80 and combines these bits into one designated register (or vector.) The register may be contained in a global register file 50 or may be any other memory storage device. In one embodiment of the present invention, these bits are moved and combined into one register in global register file 50. The ordering of bits in registers of global register file 50 associates each bit with an element of processing element array 80.

In one embodiment, in response to a single instruction called "MOVFVPCR", vector sequencer 45 transmits a signal to mux/demux circuitry 85, indicating the direction of data movement. In one embodiment, one instruction is used to access status information of processing element array 80. In alternate embodiments, more than one instruction is used to access status information. The instruction "MOVFVPCR" indicates a data move to global register file 50 from each control register VPCR(n), where n=0, 1, 2, . . . , 15. In one embodiment of the present invention, instruction "MOVFVPCR" moves a subset of the processing element array 80. An instruction format labels a destination field "destination" and a source bit position "#N". The instruction format is written as "MOVFVPCR" "#N", "destination"

The data path of movement is illustrated in FIG. 4, where global register file 50 includes several registers or vectors. In one embodiment, the destination refers to the address of an individual register. In another embodiment of the present invention, a predetermined register in global register file 50 stores VT information from all processing elements in processing element array 80. In one embodiment, there is a sequential correlation between bit positions of the destination register in the global register file 50 and its associated PE. Since the destination register can be used to store VT information, it allows efficient evaluation of a plurality of processing elements from processing element array 80. Instruction "MOVFVPCR" allows compilation of status information from multiple processing elements with a single instruction.

Instruction "MOVFVPCR" is used to move data from a source bit position, such as VPCR(0) 81, to a destination within global register file 50. In one embodiment of the present invention, the source is predetermined as control registers VPCR(n), where n=0, 1, . . . , 15. Vector sequencer 45 receives instruction "MOVFVPCR" and transmits a bit select signal 6 to initiate data movement. Note that the bit select signal 6 could be one or more signals, used to transmit control information or other information from vector sequencer 45. Instruction "MOVFVPCR" indicates that movement is from processing element array 80 and that mux/demux circuitry 85 is to be in mux mode. Each bit in VPCR(0) 81 is coupled to mux/demux circuitry 85, which receives inputs from source position "#N" in VPCR(n) for n=0, 1, . . . , 15. Mux/demux circuitry 85 transmits bit information to the destination location. In one embodiment, VT bit 97 is the least significant bit of VPCR(0) 81, and therefore N=0.

In an alternate embodiment of the present invention, data is shifted out of control register VPCR(0) 81, and stored in an interim storage unit. Storing data in an interim storage unit adds to data processing time and requires additional storage units and/or instructions. In one embodiment, data may be shifted out of control register VPCR(0) 81 using a shift register, or any other type of circuitry. In other embodiments where source bit position "#N" in VPCR(0) 81 is predetermined, other bit positions in VPCR(0) 81 may be accessed by shifting bits into the bit position "#N". Having a predetermined bit position "#N", allows for cost efficient design by reducing connectivity needs of data processor 5.

A single instruction, "MOVFVPCR" combines information from a plurality of processing elements into a single global register. Compilation of those status critical to control decisions is efficient and convenient for operation of vector engine 70. The ability to access the status of multiple processing elements with one instruction is a parallel approach to data processor 5 control.

The two instructions, described in the embodiment of the present invention, provide parallel data movement in a parallel processing system 3. The examples discussed show the practical applications and far reaching effects of two such instructions. Instruction "MOVFVPCR" can be used to accurately and concisely evaluate the status of a plurality of processing elements in processing element array 80. Instruction "MOVTVPCR" can be used to quickly and efficiently affect control of a plurality of processing elements in processing element array 80. In addition to these are many other applications in parallel processing systems.

In some embodiments, these instructions include additional fields which allow for selectable destination, source and/or bit position. In other embodiments, data is made available for logical manipulations and operations. In one embodiment, bit position is selectable as "#N", and consistent in all control registers affected. In an alternate embodiment, bit position is calculated based on an initial value "#N", and may vary over VPCR(n), for n=0,1, . . . , 15. In alternate embodiments, instructions include additional fields to allow for other parameters, such as selectable source and/or destination locations, multiple source and/or destination locations. Source and destination fields may be provided to and from other modules within processing system 3 or external devices or a register or could be supplied to and from a terminal of data processor 5 or any combination of these.

As discussed above, information stored in VT bits from a plurality of processing elements is a fundamental control feature, affecting operation within vector engine 70, it is often advantageous to make this information readily accessible. In one embodiment of the present invention, VT bits from a plurality of processing elements PE(0) 60 to PE(15) 64 are combined into one or more registers or vectors. This allows information to be evaluated and changes affected in a parallel manner, eliminating the isolated control and data movement of non-array based systems. In one embodiment, VT bit information is concatenated into one or more registers in global register file 50.

These instructions are building blocks for many other operations within a parallel system. The method of register access is consistent with the parallel, array oriented operation of a single instruction multiple data processor 5. Data processor 5 is capable of evaluating particular status information for all elements of processing element array 80 in a parallel fashion. The present invention also allows data processor 5 to control all processing elements in processing element array 80 in a parallel fashion. Data movement instructions of the present invention, allow for many permutations and offer designers and users a flexible solution for parallel, array based systems.

Alternate Embodiments of the Present Invention

The present invention provides two flexible, efficient instructions, each allowing for many possible types of data movement. The specific data movement depends on several factors, such as system configuration, data processor configuration, application, and any other specific characteristic influenced by design, usage, or manufacture.

For design simplicity and implementation considerations, some designers may choose to predetermine source and destination locations, bit positions, etc. Note that in alternate embodiments, bits other than VT bits, control bits, and/or status bits are selectable for data movement. In alternate embodiments of the present invention, source location and/or destination location are selectable. In one embodiment of the present invention, for source register and destination register designations are provided to and/or from other devices external to parallel processing system 3.

In other designs, programming considerations may determine that various bits are combined into separate locations in global register file 50. One embodiment of the present invention involves data movement from a plurality of processing elements to logical operation circuitry, where a logical, Boolean, or any other operation is performed, such as AND, OR, NOT, or any combination thereof. In one embodiment of the present information, output from an operation is used as feedback for future control decisions.

Alternate embodiments allow data movement from processing element array 80 to interface circuitry 30. As parallel processing systems grow in size, the value of a flexible, accessible processing element array 80 increases dramatically. The present invention provides a method of data movement for parallel processing, consistent with the nature of parallel movement and data flow. The present invention offers a level of flexibility and efficiency in parallel processing system design and applications.

We claim:

1. A method for moving data in a parallel data processing system from a processing element array x, to a vector array y, wherein the processing element array x includes of a plurality of elements wherein each element has at least one associated storage circuit, the method comprising the steps of:

providing a single instruction to the parallel data processing system;

in response to receipt of the single instruction, the data processing system performing the steps of:

reading an Nth bit from the at least one associated storage circuit associated with a first one of the plurality of elements, where N is a positive integer;

reading the Nth bit from the at least one associated storage circuit associated with an Mth one of the plurality of elements, where M is a positive integer; and combining all read Nth bits into a single combined vector.

2. A method as in claim 1, further comprising the step of:

moving the single combined vector to a vector location in the vector array y.

3. A method as in claim 2, wherein in response to receipt of the single instruction, the data processing system further performs the step of:

reading the Nth bit from each at least one associated storage circuit associated with each one of the plurality of elements.

4. A method as in claim 2, wherein the processing element array x consists of X elements, and the vector array y is a bit length Y, where X and Y are positive integers.

5. A method as in claim 4, wherein a first bit of a vector in the vector array y has a predetermined correspondence to the first one of the plurality of elements, and an Mth bit in the vector in the vector array y has a predetermined correspondence to the Mth one of the plurality of elements.

6. A method as in claim 4, wherein the bit length Y of the vector array y is greater than or equal to X.

7. A method as in claim 2, wherein the Nth bit of the at least one associated storage circuit associated with the first one of the plurality of elements has a predetermined significance to the first one of the plurality of elements, and the Nth bit from the at least one associated storage circuit associated with the Mth one of the plurality of elements has the predetermined significance to the Mth one of the plurality of elements for all X elements.

8. A method as in claim 7, wherein the predetermined significance of the Nth bit of the at least one associated storage circuit is to enable and disable the first one of the plurality of elements.

9. A method as in claim 2, wherein the vector array y is comprised of a single vector.

10. A method as in claim 2, wherein the single instruction includes a source field designating N, and a destination field designating the vector location in the vector array y.

11. A method as in claim 2, wherein at least one of a source field designating N and a destination field designating the vector location is provided other than as a field in the single instruction.

12. A method as in claim 11, wherein at least one of the source field designating N and the destination field designating the vector location is provided by a register.

13. A method as in claim 2, wherein the Nth bit is a predetermined bit.

14. A method as in claim 2, wherein the vector location in the vector array y is a predetermined vector location.

15. A method as in claim 2, further comprising the step of:

counting all asserted bits or all negated bits in the vector location of vector array y.

16. A method as in claim 2, wherein the at least one associated storage circuit is a user programmable register.

17. A method as in claim 2, wherein the step of reading an Nth bit from the at least one associated storage circuit associated with a first one of the plurality of elements and the step of reading the Nth bit from the at least one associated storage circuit associated with an Mth one of the plurality of elements are performed essentially concurrently.

18. A method as in claim 2, wherein the single instruction has a pneumonic "MOVFVPCR".

19. A method as in claim 2, wherein the step of reading an Nth bit consists of shifting bits out of the at least one associated storage circuit.

20. A method as in claim 2, wherein the step of combining all read Nth bits, further performs the step of:

moving a combination of read Nth bits into a temporary storage circuit.

21. A method as in claim 1, further comprising the step of:

supplying the single combined vector to a logic circuitry.

22. A method as in claim 21, wherein in response to receiving the single combined vector, logic circuitry performs a logical operation, providing an output result.

23. A method for moving data in a parallel data processing system to a processing element array x, from a vector array y, wherein the processing element array x consists of a plurality of elements, where each element has an associated storage circuit, the method comprising the steps of:

providing a single instruction to the parallel data processing system;

in response to receipt of the single instruction, the data processing system performing the steps of:

reading a first bit from a vector in the vector array y;

reading an Mth bit from the vector in the vector array y, where M is a positive integer;

moving the first bit from the vector to an Nth bit of the associated storage circuit associated with a first one of the plurality of elements in the processing element array x, where N is a positive integer; and moving the Mth bit from the vector to the Nth bit of the associated storage circuit associated with an Mth one of the plurality of elements in the processing element array x.

24. A method as in claim 23, wherein the processing element array x consists of X elements, and the vector array y is a bit length Y.

25. A method as in claim 23, wherein a first bit of the vector has a predetermined correspondence to the first one of a plurality of elements, and an Mth bit in the vector has the predetermined correspondence to an Mth one of the plurality of elements.

26. A method as in claim 24, wherein the Nth bit of the associated storage circuit associated with the first one of the plurality of elements has a predetermined significance to the first one of a plurality of elements, and the Nth bit from an associated storage circuit associated with the Mth one of the plurality of elements has the predetermined significance to the Mth one of the plurality of elements for all X elements.

27. A method as in claim 25, wherein the predetermined correspondence is a sequential one-to-one correspondence.

28. A method as in claim 23, wherein the vector array y is a single vector.

29. A method as in claim 23, wherein the single instruction includes a source field designating the vector, and a destination field designating N.

30. A method as in claim 29, wherein at least one of the source field designating the vector and the destination field designating N is provided other than as a field in the single instruction.

31. A method as in claim 29, wherein at least one of the source field designating the vector and the destination field designating N is provided by a register.

32. A method as in claim 23, wherein which bit is the Nth bit is a user selectable.

33. A method as in claim 23, wherein the vector is a predetermined vector.

34. A method as in claim 23, wherein the single instruction has a pneumonic "MOVTVPCR".

35. A data processing system capable of executing data processing instructions which move data, the data processing system comprising:

a processing element array x having a plurality of processing elements, each one of the plurality of processing elements having an associated storage circuit;

a vector array y, having a first vector;

a communication bus coupled to said processing element array x and to said vector array y;

wherein a first one of the plurality of processing elements comprises:

a first multiplex/demultiplex circuit for routing data bits between the communication bus and the associated storage circuit in the first one of the plurality of processing elements;

wherein a second one of the plurality of processing elements comprises:

a second multiplex/demultiplex circuit for routing data bits between the communication bus and the associated storage circuit in the second one of the plurality of processing elements; and wherein the data processing system further comprises:

a vector sequencer, coupled to the plurality of processing elements, said vector sequencer receiving a data movement instruction and in response thereto initiating a data move between the processing element array x and the vector array y, providing a first bit select signal to the first multiplex/demultiplex circuit, and providing a second bit select signal to the second multiplex/demultiplex circuit.

36. The data processing system according to claim 35, further comprising:

first means for moving data, wherein in response to an outward data movement instruction said first means executing a move from the processing element array x to the vector array y; and second means for moving data, wherein in response to an inward data movement instruction said second means executing a move from the vector array y to the processing element array x.

37. The data processing system according to claim 36, wherein a first bit of a vector in the vector array y has a predetermined correspondence to the first one of the plurality of processing elements, and a second bit in the vector in the vector array y has a predetermined correspondence to the second one of the plurality of processing elements.

38. The data processing system according to claim 37, wherein the outward data movement instruction includes a source field designating the first vector in the vector array y and a destination field designating a bit N in the associated storage circuit of a plurality of processing elements.

39. The data processing system according to claim 38, wherein the outward data movement instruction moves an Nth bit from the associated storage circuit of a plurality of processing elements to a corresponding bit in the first vector of the vector array y.

40. The data processing system according to claim 37, wherein the inward data movement instruction includes a source field designating a bit N in the associated storage circuit of a plurality of processing elements and a destination field designating the first vector in the vector array y.

41. The data processing system according to claim 40, wherein the inward data movement instruction moves each bit from the vector to an Nth bit of the associated storage circuit of a corresponding processing element.

42. The data processing system according to claim 36, wherein the first means for moving data multiplexes data from at least one of the plurality of processing elements to the first vector and the second means for moving data demultiplexes data from the first vector to at least one of the plurality of processing elements.

* * * * *